No. 871,827. PATENTED NOV. 26, 1907.
G. O. SEELEY.
LIQUID MEASURING DEVICE.
APPLICATION FILED JAN. 22, 1907.
4 SHEETS—SHEET 3.
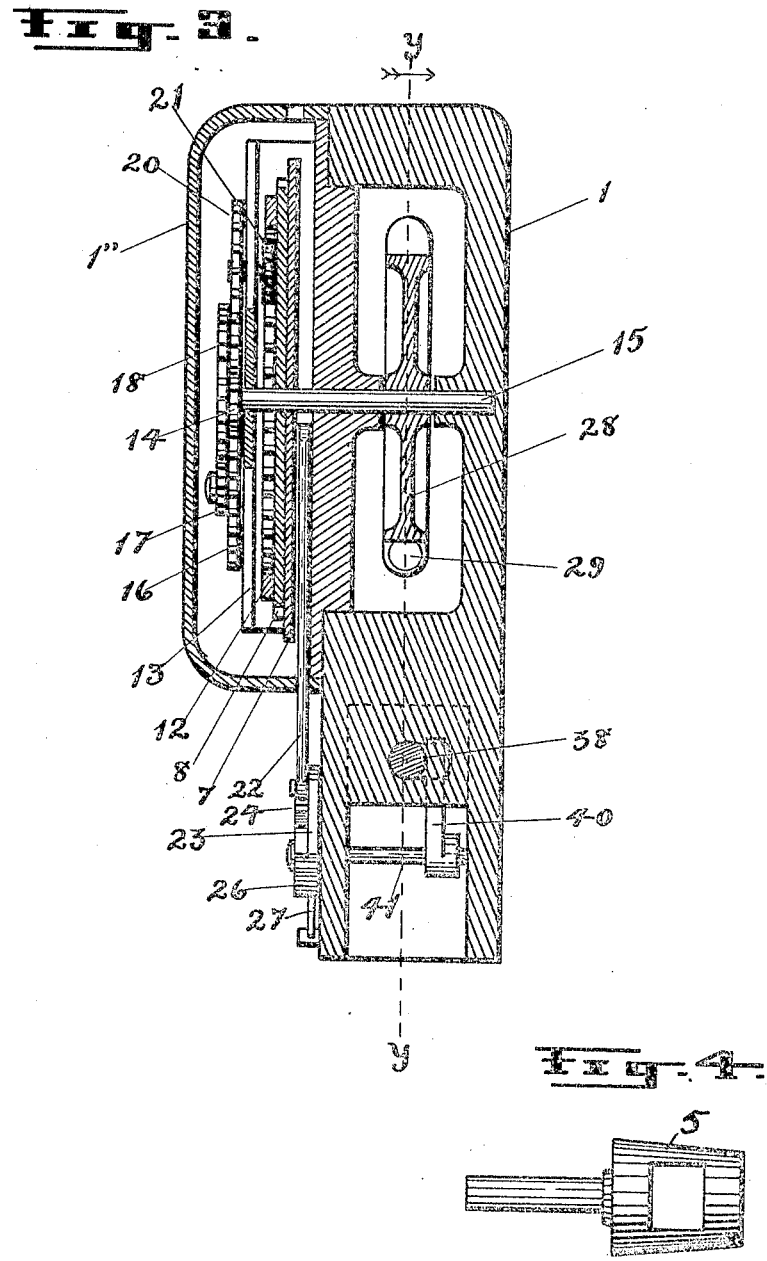

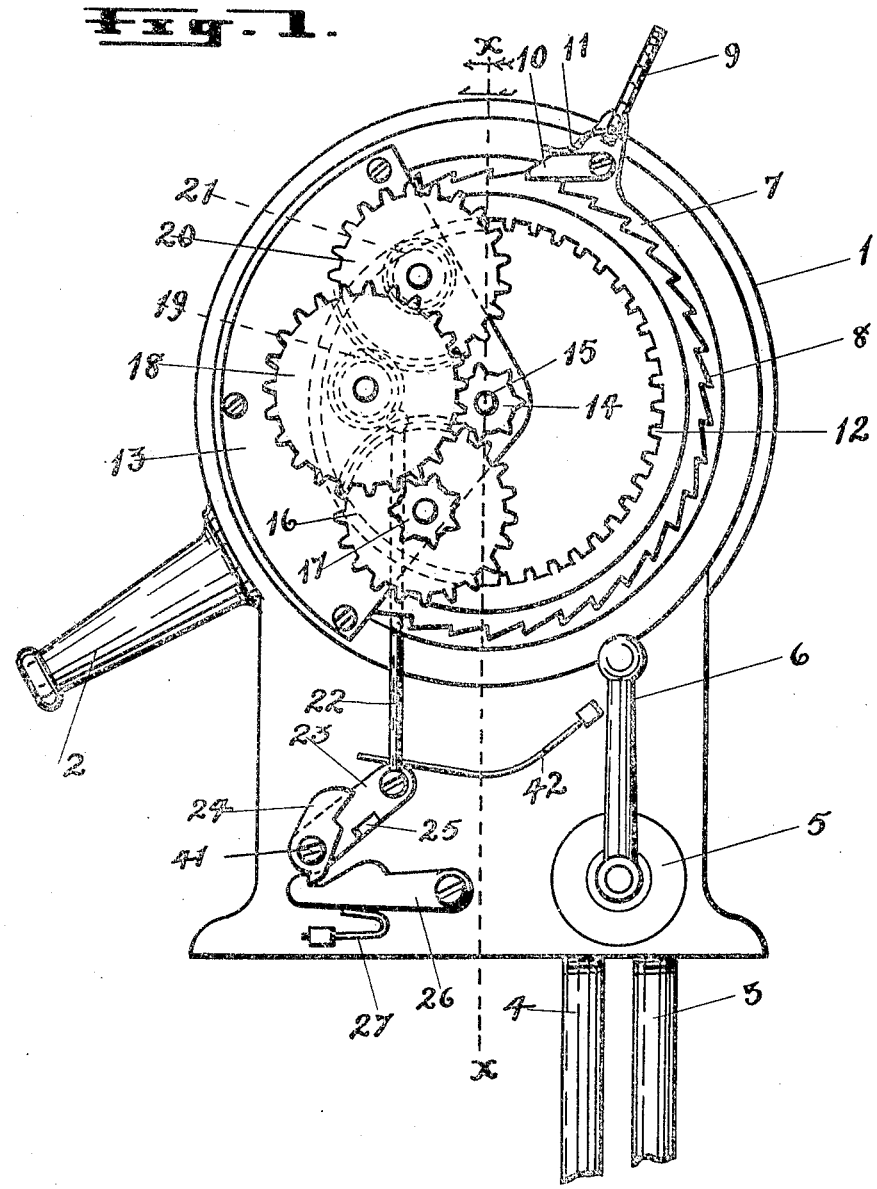

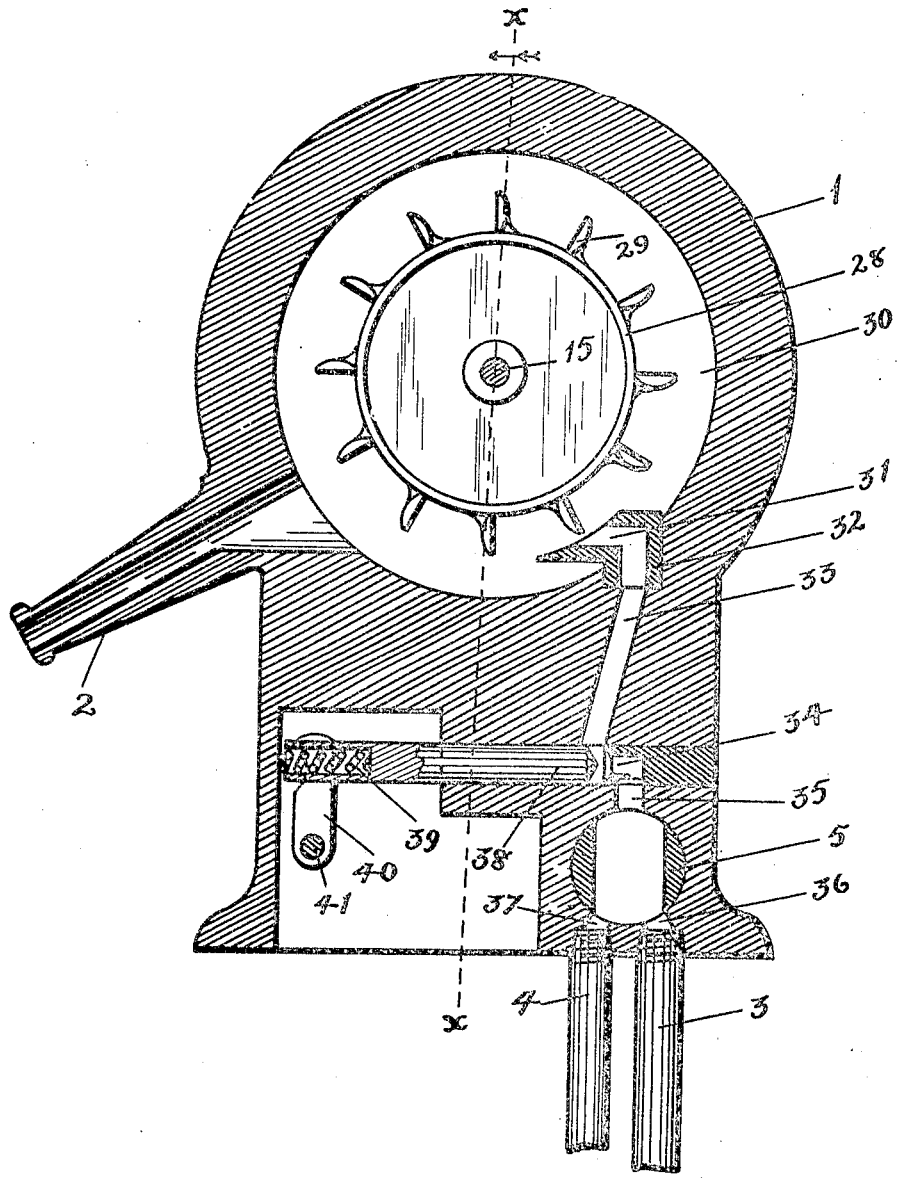

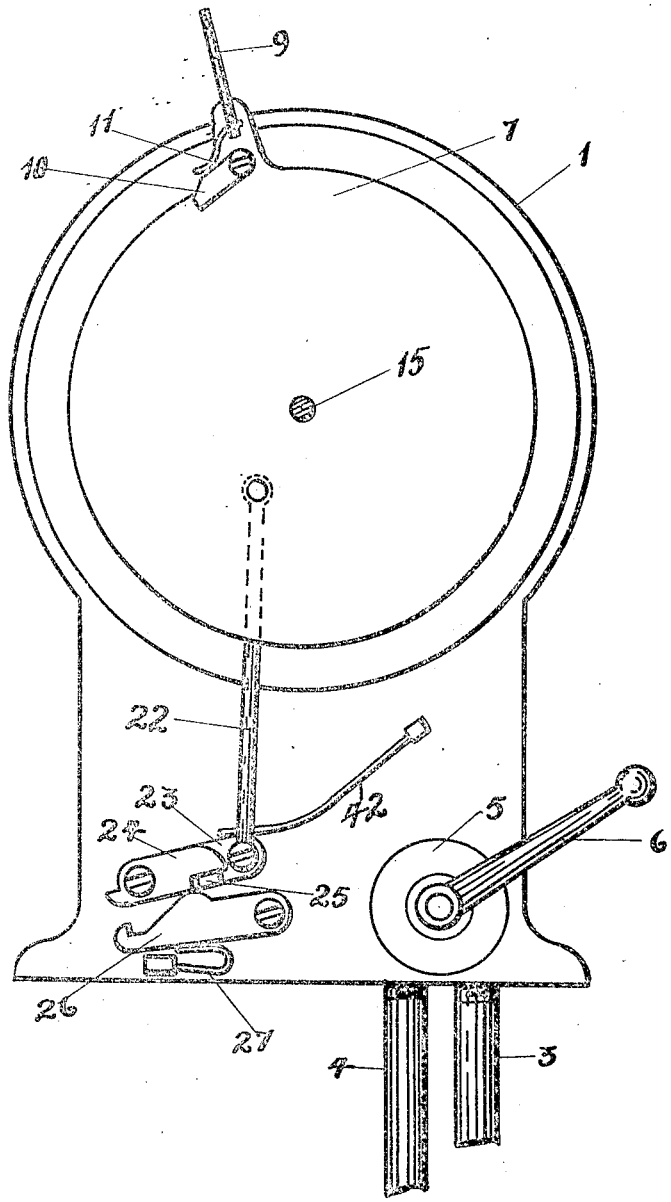

UNITED STATES PATENT OFFICE.

GEORGE O. SEELEY, OF GRAND RAPIDS, MICHIGAN.

LIQUID-MEASURING DEVICE.

No. 871,827.  Specification of Letters Patent.  Patented Nov. 26, 1907.

Application filed January 22, 1907. Serial No. 353,503.

*To all whom it may concern:*

Be it known that I, GEORGE O. SEELEY, a citizen of the United States, residing at Grand Rapids, in the county of Kent and State of Michigan, have invented a new and useful Liquid-Measuring Device, of which the following is a specification.

My invention relates to improvements in a device for the automatic delivery of liquid in any desired quantity.

The objects of this invention are, first, to provide a device in which the flow of liquid therethrough will be automatically stopped after the delivery of the desired quantity; second, to provide a device for attachment to lavatory basins whereby any desired quantity of water may be automatically delivered to the bowl; third, to provide a device for supplying any desired quantity of water to the flush of a lavatory closet; and fourth, to provide a device that may be used as an automatic liquid-measurer.

Further objects will definitely appear from the detailed description to follow.

I accomplish the objects of my invention by the devices and means described in the following specification.

The invention is clearly defined and pointed out in the claims.

A structure embodying the features of my invention is illustrated in the accompanying drawings, forming a part of this specification, in which—

Figure 1 is a side view of my device, with the outer side casing removed showing the system of gearing within. Fig. 2 is a vertical section taken on the line *y y* of Fig. 3. Fig. 3 is a vertical section taken on the line *x x* of Figs. 1 and 2. Fig. 4 is a detail of the stop-cock, showing the passage therethrough. Fig. 5 is a side view of my device, with the outer side casing and gear mechanism removed, showing the rotatable disk and the connecting means for automatically shutting-off the flow of liquid through my device.

In all of the drawings, all of the sectional views are taken looking in the direction of the little arrows at the ends of the section lines.

Similar letters of reference refer to similar parts throughout the several views.

Referring to the accompanying drawings, in the upper portion 1 of my device is the cylindrical motor chamber 30, in which is the water-wheel or motor 28 having cup-shaped buckets 29. The water-wheel is mounted upon the shaft 15 which is suitably journaled in the sides of the chamber, one end of the said shaft projecting through the side of the chamber to support certain mechanism to be described hereafter. Leading from the front of the said chamber is the spout 2, while in the rear and near the bottom of the chamber is the horizontal nozzle 31 of the inlet 32, so situated that the liquid issuing therefrom will impinge tangentially against the buckets of the wheel 28, causing rotation of the same, and will then pass out through the said spout.

As shown in the drawings, the device is constructed to be attached to the hot and cold water-pipes 3 and 4 of any lavatory system. These supply-pipes 3 and 4 communicate with the chamber 30 through the openings 36 and 37 by means of the stop-cock 5, the passage way 35, the valve 34, the passage-way 33, and the inlet 32 with its horizontal nozzle 31, the said parts communicating with each other in the order named. The stop-cock 5 is of the ordinary conical type having an opening therethrough, and is provided with the handle 6 for its rotation so as to regulate the flow of water from either supply-pipe.

The valve 34 may be of any desirable form or construction. As shown, it consists of a horizontal passage-way having a conical seat therein into which the end of the plunger 38 is adapted to seat itself, the valve being opened and closed by a reciprocating motion imparted to the plunger by the means to be described later.

On that part of the shaft 15 projecting from the side of the chamber 30 are loosely mounted the disk 7 and the ratchet-wheel 8. To the outer face of the latter is secured an annular gear-wheel 12. Upwardly-projecting from the disk 7 is a thumb-piece 9, at the base of which is the pawl 10 for engaging the teeth on the ratchet-wheel 8. This pawl is held in close engagement with the said teeth by the spring 11. Secured to the extremity of the said shaft is the driving-gear 14.

To the side of my device, at its outer edge, is secured the sector-plate 13. The purpose of this sector-plate is to support a system of gearing for transmitting motion from the driving-gear 14 to the annular gear-wheel 12 and its attached ratchet-wheel 8. This system of gearing consists of three pairs of spur-gears, 16 and 17, 18 and 19, 20 and 21, each pair consisting of a large and a small gear mounted on an independent shaft. These independent shafts are supported by the sector-plate 13, and are parallel to the driving-shaft 15. As shown, the driving-gear 14 meshes with the gear 16, while the gear 21 meshes with the annular gear-wheel 12. The whole system of gearing is so arranged that the rotation of the driving-gear 14 in one direction will cause the annular gear-wheel 12 and its attached ratchet-wheel 8 to rotate in the opposite direction. The gears, sector, ratchet-wheel and disk are all inclosed within the casing 1'' secured to the side of the device.

Depending from the inside face of the disk 7, and eccentrically pivoted thereto, is the rod 22, the lower end of which is secured to the rock-shaft 41 by the link 23. Attached to the lower end of the rod 22 is the spring 42, the function of the latter being to exert a downward tension on the said rod, which in turn imparts a tendency to the disk 7 to rotate forwardly. As the pawl 10 engages the teeth on the ratchet-wheel 8, any forward-rotating movement of the ratchet-wheel will be accomplished by a corresponding movement of the disk 7. Secured to the end of the said rock-shaft, and adjacent to the said link, is the arm 24, provided at one end with a spur or projection and at the other end with a recess to receive the stop 25 on the said link. This stop is to prevent any further movement downwardly of the arm 24, after the arm and the link have assumed a coincident position. Below the link 23, and pivoted to the side of the device, is the pawl 26 having a combined thickness of both link 23 and arm 24. This pawl is provided at its outer end with an upwardly-projecting hook or catch for engagement with the spur on the end of the arm 24, and on its upper edge with a boss for engagement against the link 23. The pawl is normally maintained in a horizontal position by the spring 27.

At the inner end of the rock-shaft 41 is the arm 40 adapted to engage the end of the plunger 38. This plunger is provided with the spring 39 for normally keeping the plunger seated in the valve 34, and is of sufficient tension to overcome the pressure of water in the valve.

When it is desired to use my device, the disk 7 is rotated backwards by means of the thumb-piece 9, the pawl 10 engaging with the ratchet-wheel 8. This rotation of the disk gives an upward movement to the rod 22 and the link 23. The stop 25 then bears against the arm 24 causing it to assume a vertical position and to lock with the pawl 26. The motion of the arm 24 is transmitted through the rock-shaft 41, causing the plunger 38 to move laterally, thus opening the valve 34. The water, rushing through this valve and the connecting passage-ways and nozzle into the chamber 30, causes the motor or water-wheel therein to turn and with it the shaft and the driving-gear 14. This motion of the driving-gear is transmitted through the system of gearing to the annular gear-wheel 12, whereby it is revolved together with the attached ratchet-wheel 8 in a direction opposite to that of the gear 14, or in the direction of the arrow shown in Fig. 1. Through the action of the spring 42 upon the arm 22 and the medium of the pawl 10, this forward rotation of the ratchet-wheel causes a corresponding movement of the disk 7. This forward rotation of the disk 7 depresses vertically the rod 22, which depression brings the link 23 into contact with the boss on the pawl 26, thus pressing down the latter. Just as the disk 7 has reached its initial forward position, the sector-plate 13 acting as a stop, the arm 24 and the pawl 26 suddenly unlock, whereupon the spring 39 on the plunger 38 immediately forces the latter into its valve-seat thus stopping the flow of water through the valve 34.

It is, of course, apparent that the device I have shown and described is capable of considerable variation in structural details and in its operating mechanism without, however, departing from my invention.

Having thus described my invention, what I claim as new, and desire to secure by Letters Patent, is:

1. In a device of the class described, the combination of a chamber having inlet and outlet openings; a motor, suitably mounted upon a shaft, in said chamber; a valve controlling the flow of liquid to said chamber and provided with a spring for keeping said valve normally closed; a ratchet-wheel loosely mounted upon said motor shaft and having an annular gear-wheel attached thereto; a rotatable disk loosely mounted upon said motor shaft and provided with a spring-pressed pawl to engage said ratchet-wheel while said disk is resuming its initial position; a tension device to normally cause the rotation of said disk in one direction; means, comprising a rod, link, and rock-shaft, connecting said disk and said valve whereby the valve is opened by the rotation of the disk in one direction; a driving-gear on said motor shaft; a system of gearing intermediate the said driving-gear and said ratchet-wheel; and a locking-device coöperating with said connecting means whereby the said valve is kept open until the said disk has resumed its initial position; all coacting for the purpose specified.

2. In a device of the class described, the combination of a chamber having inlet and outlet openings; a spring-pressed valve controlling the flow of liquid to said chamber; a motor in said chamber; a ratchet-wheel having an annular gear-wheel attached thereto; a rotatable disk adapted to move in unison with said ratchet-wheel in one direction; means connecting said disk with said valve, whereby the said valve is opened by the rotation of the disk; a driving-gear operated by said motor; means intermediate the said driving-gear and said ratchet-wheel for transmitting motion from the former to the latter; and a locking-device coöperating with said connecting means whereby the said valve is kept open until the said disk has resumed its initial position; all coacting for the purpose specified.

3. In a device of the class described, the combination of a chamber having inlet and outlet openings; a self-closing valve controlling the flow of liquid to said chamber; a motor in said chamber; a ratchet-wheel having an annular gear-wheel attached thereto; a rotatable disk adapted to move in unison with said ratchet-wheel in one direction; means connecting said disk with said valve, whereby the valve is opened by the rotation of the disk in one direction; a driving-gear operated by said motor; means intermediate the driving-gear and said ratchet-wheel for transmitting motion from the former to the latter; and means coöperating with said connecting means whereby the said valve is kept open until the said disk has resumed its initial position; for the purpose specified.

4. In a device of the class described, the combination of a chamber having inlet and outlet openings; a motor in said chamber; a self-closing valve controlling the flow of liquid to said chamber; a ratchet-wheel; a rotatable disk adapted to move in unison with said ratchet-wheel in one direction; means connecting said disk with said valve whereby the opening and closing of the valve is controlled by the rotation of the disk; means intermediate the motor and the ratchet-wheel for transmitting motion from the former to the latter; and a locking-device coöperating with said connecting means whereby the valve is kept open until the disk has resumed its initial position.

5. In a device of the class described, the combination of a chamber having inlet and outlet openings; a motor in said chamber; a self-closing valve controlling the flow of liquid to said chamber; a rotatable disk; means connecting said disk with said valve whereby the valve is opened by the rotation of the disk; means intermediate the motor and the disk for transmitting motion from the former to the latter; and a locking-device for keeping said valve open until the disk has resumed its initial position.

6. In a device of the class described, the combination of a chamber having inlet and outlet openings; a self-closing valve; a motor in said chamber; a rotatable disk; means connecting said disk with said valve whereby the valve is opened by the rotation of the disk; means intermediate the motor and the disk for transmitting motion from the former to the latter; and means for keeping said valve open until the disk has resumed its initial position.

7. In a device of the class described, the combination of a chamber having inlet and outlet openings; a self-closing valve controlling the flow of liquid to said chamber; a motor in said chamber; a rotatable disk; means connecting said disk with said valve whereby the valve is opened by the rotation of the disk; means intermediate the motor and the disk for transmitting motion from the former to the latter; and means for keeping said valve open until a desired quantity of liquid has passed through said chamber when the valve is released and closed automatically.

GEO. O. SEELEY.

Witnesses:
W. C. MARGESON,
HENRY T. HEALD.